May 8, 1934.  C. RACHEL  1,957,728
LOCKING DEVICE FOR BULL RINGS
Filed June 22, 1932
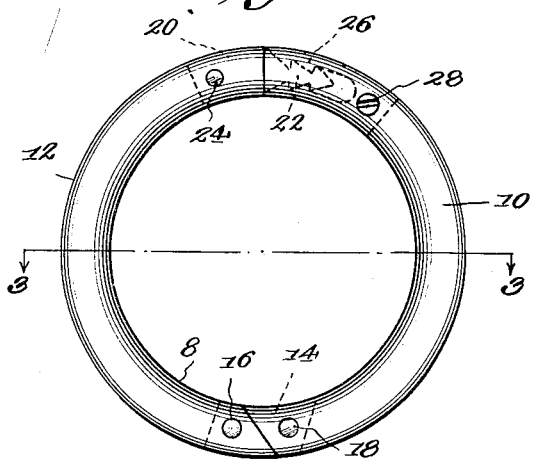
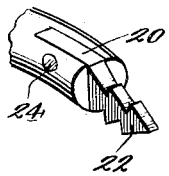  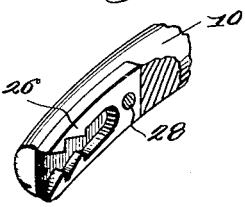
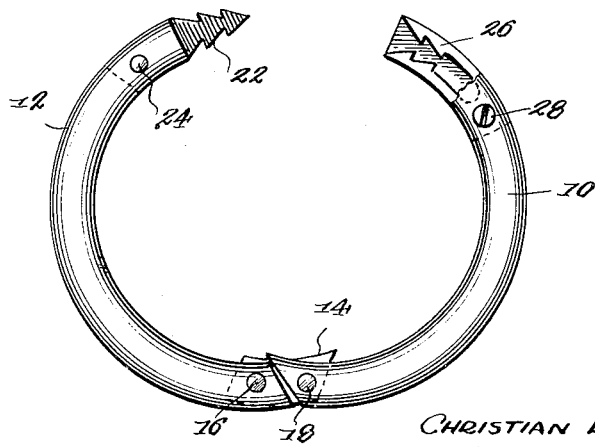
Inventor
CHRISTIAN RACHEL
By Peter Flaherty
Attorney Patented May 8, 1934

1,957,728

UNITED STATES PATENT OFFICE 1,957,728

LOCKING DEVICE FOR BULL RINGS

Christian Rachel, Burlington, Wis.

Application June 22, 1932, Serial No. 618,798

7 Claims. (Cl. 119—135)

The present invention relates to a bull ring and more particularly to a novel fastening device for securing the ends of the ring together.

When it is desired to place a ring in the nose of a bull or other animal, the cartilage of the nose of the bull is pierced by means of a punch or any similar device and the ring is thereafter inserted through the aperture and heretofore considerable difficulty has been encountered in the fastening of the ends of the ring together resulting in great pain to the animal and it is one of the objects of the present invention to provide a fastening or locking device which is connected to the ends of the ring and which will enable the ring to be securely and quickly fastened thereby preventing the usual pain incident to the insertion of such a ring to the animal.

Another important object of the present invention is to provide a locking device in which all parts are disposed within the ring proper when the ring is closed to present a substantially smooth, external surface so that when the ring is turned through the nose of the animal it will not cause any injury or pain.

Another important attribute of the invention is to provide a ring of the character described in which the locking device of the ring is constructed of such a shape as to enable the ring to be easily inserted in the aperture in the nose of the animal.

Another important object of the invention is to provide a locking device which may be locked and unlocked with facility.

The invention contemplates the provision of a pair of semi-circular ring segments which are hingedly connected at one end, and at their other ends are provided with bifurcated portions in which there are respectively disposed an attaching male shank and a female socket member.

In the accompanying drawing, forming a part of this application and in which like numerals are employed to designate like parts throughout the same, Figure 1 is a front elevational view of the ring showing the ring with the attaching device in locked position, Figure 2 is a top plan view, Figure 3 is a horizontal sectional view of Figure 1, taken on line 3—3, looking in the direction of the arrows, Figure 4 is a front elevational view showing the device in unlocked position, Figure 5 is a detailed view showing the bifurcated ends with the attaching shank or male attaching member therein, and Figure 6 is a detailed view partly in section showing the attaching member or female socket in position in one end of the bifurcated ring segment.

In the drawing, wherein for the purpose of illustration is shown a preferred embodiment of the invention, the reference numeral 8 generally designates a ring which is adapted to be inserted in the nose of a bull or a similar animal and comprises a pair of semi-circular segments 10 and 12 provided with bifurcated end portions which are hingedly connected together by means of a hinge 14. The hinge 14 is inserted in the bifurcated sockets and is provided with a pair of spaced apertures adapted to register with apertures through the bifurcated ends, in which are disposed pins 16 and 18.

The opposed hinged end portions of the semi-circular segments 10 and 12 are disposed at an angle for a purpose to be hereinafter more fully described. The other bifurcated end portions form sockets in which there are disposed the attaching devices.

As clearly illustrated in Figure 4, the semi-circular ring segment 12 has inserted in the bifurcated socket 20, a laterally extending arcuate attaching shank or male member 22, which is firmly secured therein by means of a rivet 24 or the like, extending through the bifurcated end section and the attaching shank. The laterally extending arcuate shaped attaching shank is pointed and provided with serrated sides as clearly illustrated in Figure 4.

A resilient female attaching plate 26 is adapted to be disposed within the bifurcated end portion of the other semi-circular segment 10 and is provided with a shank receiving socket of the same configuration as the attaching shank to the end that the attaching shank may be inserted within the socket and the same will be held securely and firmly in position therein. The attaching socket 26 is secured in the bifurcated end of the segment 10 by means of a set screw 28 which extends through the segment 10 and the member 26.

As clearly illustrated in Figure 2, the attaching shank is pointed so that the cartilage of the animal's nose may be pierced by means of the attaching shank or the same may be inserted in an aperture in the cartilage of the nose of the animal which has been previously punched therein by means of a punch or any similar device. After the ring has been inserted through the cartilage of the nose of the animal, the ends of the segments 10 and 12 may be securely fastened together by merely inserting the attaching shank within the female attaching socket and this can be done by means of a single operation and within a fraction of a second to the end that the usual difficulty and pain incident to the fastening of the ends of the ring is eliminated.

When it is desired to remove the ring from the nose of the animal it is only necessary to remove the set screw 28 thereby permitting the socket member 26 to be withdrawn from the bifurcated end portion of the segment 10.

The ring segments may, if so desired, be constructed of resilient material and this, together with the novel hinge structure and the angularly opposed end portions of the segments 10 and 12 normally urge the segments away from each other to the end that the attaching shank is held rigidly in the attaching socket.

It will thus be seen that there is provided a ring in which the attaching socket is disposed within the ring so that any portion of the ring may be passed thru the aperture in the cartilage of the nose of the animal without causing any severe pain, there being no surface inequalities on the outer portion of the ring.

I claim:—

1. A bull ring comprising a pair of pivoted connected members, the free ends thereof being bifurcated, a triangular-shaped male attaching shank in one of the bifurcated ends having serrations in the side portions thereof, a female socket in the other bifurcated end having serrated sides to receive the male attaching shank, and means for removably securing one of said members in its bifurcated end.

2. A bull ring comprising a pair of pivoted ring segments having bifurcated free end portions, a pointed serrated male attaching member in one of said bifurcated end portions, a serrated attaching plate for receiving said attaching member in the other bifrucated end, and means for securing said attaching member and said plate in said bifurcated ends, one of said means being removable to permit of the removal of one of said attaching members.

3. A bull ring comprising a pair of pivoted ring segments having sockets in the free end portions thereof, a pointed serrated male attaching shank in one of said sockets, a serrated female attaching plate in the other socket, and means for securing said shank and said plate in said sockets, one of said means being removable to permit of the removal of one of said attaching members.

4. A bull ring comprising a pair of ring segments, a hinge pivotally connecting said segments, the adjacent sides of the ring segments hingedly connected together being disposed at an angle whereby when the free ends of the ring segments are brought into contacting position, the segments are under tension, the free ends of said segments being provided with slots opening out through opposite sides of the sections, a fastening element in each slot, said fastening elements being provided with means interlocking said elements, and a securing device extending through the slotted end portion and one of the fastening elements and being freely removable therefrom to permit of the bodily removal of the fastening element from the slot in which it is secured.

5. A bull ring comprising a pair of pivoted connecting members, the free ends thereof being bifurcated, a triangular-shaped attaching member in one of the bifurcated ends having oppositely disposed notches in the side portions thereof, an attaching plate in the other bifurcated end portion of the members having a socket therein of substantially the same configuration as the triangular-shaped male attaching member and adapted to receive the triangular-shaped attaching member to maintain the pivoted members in closed position, and a securing device extending through one of the bifurcated end portions and the attaching member and being freely removable therefrom to permit of the bodily removal of the attaching member.

6. In a bull ring, a pair of sections, one of said sections being provided with a slot opening out through the end and one side of that section, a fastening element in said slot, and a securing device extending through the slotted end portion of said section and the adjacent portion of said fastening device, and a second fastening element carried by the adjacent end of the other section and having means interlocking with the first named fastening device, said securing device being detachable to allow of the bodily removal of the first named fastening element from the slot while the first and second named fastening elements are in interlocked position.

7. In a bull ring, a pair of arcuate sections of round stock having meeting ends formed with slots opening out through opposite sides of the sections, a fastening element in one of said slots and a second fastening element in the other slot and being provided with means interlocking with the first named fastening element, and a securing device extending through the slotted end portion of one of said sections and the adjacent portion of one of the fastening elements and being freely removable from the arcuate section to allow of the bodily removal of the adjacent fastening element from the slot in which it is secured, said first and second named fastening elements having the inner and outer edges thereof flush with the periphery of the ring and substantially filling the peripheral portions of said slots to present a substantially smooth external surface.

CHRISTIAN RACHEL.